United States Patent
Nalluri et al.

(10) Patent No.: US 9,396,032 B2
(45) Date of Patent: Jul. 19, 2016

(54) PRIORITY BASED CONTEXT PREEMPTION

(71) Applicant: Intel Corporation, Santa Clara, CA (US)

(72) Inventors: Hema C. Nalluri, Hyderabad (IN); Aditya Navale, Folsom, CA (US); Peter L. Doyle, El Dorado Hills, CA (US); Murali Ramadoss, Folsom, CA (US); Balaji Vembu, Folsom, CA (US); Jeffery S. Boles, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/227,692

(22) Filed: Mar. 27, 2014

(65) Prior Publication Data

US 2015/0277981 A1   Oct. 1, 2015

(51) Int. Cl.
  *G06F 9/46* (2006.01)
  *G06F 9/50* (2006.01)
  *G06T 1/20* (2006.01)

(52) U.S. Cl.
  CPC ............... *G06F 9/5038* (2013.01); *G06T 1/20* (2013.01)

(58) Field of Classification Search
  None
  See application file for complete search history.

(56) References Cited

U.S. PATENT DOCUMENTS

| | | | | |
|---|---|---|---|---|
| 5,592,678 A * | 1/1997 | Cook | ......................... | G06F 3/14 719/323 |
| 6,237,071 B1 * | 5/2001 | Kim | ........................ | G06F 9/3867 711/154 |
| 8,547,339 B2 | 10/2013 | Ciesla | | |
| 2002/0087219 A1 * | 7/2002 | Dai | ........................ | G06F 1/3203 700/21 |
| 2004/0236930 A1 * | 11/2004 | Diepstraten | ........... | G06F 9/4812 712/220 |
| 2005/0005088 A1 * | 1/2005 | Yearsley | ............. | G06F 9/30123 712/235 |
| 2011/0055469 A1 * | 3/2011 | Natu | ........................ | G06F 9/461 711/105 |
| 2011/0131374 A1 * | 6/2011 | Noeldner | ................ | G06F 12/00 711/114 |
| 2011/0246998 A1 * | 10/2011 | Vaidya | .................. | G06F 9/4881 718/103 |
| 2012/0230341 A1 * | 9/2012 | Mital | ..................... | G06F 9/3009 370/400 |
| 2013/0019052 A1 * | 1/2013 | Somanache | ......... | G06F 13/1684 711/103 |
| 2013/0070515 A1 * | 3/2013 | Mayhew | ............ | G11C 13/0002 365/148 |
| 2013/0173861 A1 * | 7/2013 | Comparan | .......... | G06F 12/0817 711/122 |
| 2014/0006661 A1 * | 1/2014 | Chappell | ................. | G06F 13/42 710/105 |
| 2014/0032947 A1 * | 1/2014 | Ahmad | .................. | G06F 9/4418 713/320 |
| 2014/0184617 A1 * | 7/2014 | Palmer | ....................... | G06T 1/20 345/506 |
| 2015/0095918 A1 * | 4/2015 | Alameldeen | ........ | G06F 12/0811 718/104 |
| 2015/0235998 A1 * | 8/2015 | Moran | .................. | H01L 25/117 257/777 |

FOREIGN PATENT DOCUMENTS

CN   103198025 A   7/2013

OTHER PUBLICATIONS

Search Report received for Taiwanese Patent Application No. 104104264, dated Oct. 6, 2015, 2 pages including 1 page of English translation.

* cited by examiner

*Primary Examiner* — Adam Lee
(74) *Attorney, Agent, or Firm* — Jordan IP Law, LLC

(57) ABSTRACT

Methods and apparatuses may prioritize the processing of high priority and low priority contexts submitted to a processing unit through separate high priority and low priority context submission ports. According to one embodiment, submission of a context to the low priority port causes contexts in progress to be preempted, whereas submission of a context to the high priority port causes contexts in progress to be paused.

21 Claims, 8 Drawing Sheets

PRIORITY BASED CONTEXT PREEMPTION

BACKGROUND

Computer hardware architecture generally processes a workload in some predetermined sequence. Nevertheless, that sequence can be preempted. Such preemptions may incur substantial latency times, slowing down the system. This latency impact may be especially noticeable in such processor-intensive activities as graphics processing and more specifically three-dimensional (3D) rendering.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

At a suitably high level of a computer system, an application may submit a workload to a driver, which in turn may submit a corresponding context (also known as a "task") to hardware. On a given computer system there may be multiple contexts underway—the workload—making use of the computer hardware. The operating system may manage these multiple contexts, providing each context with a window of hardware time using the time sharing capabilities of the computer and its operating system. The speed with which these contexts are handled at least partially defines the efficiency of the computer system.

One approach to enhancing efficiency has been to permit some contexts to preempt lower priority contexts. This may arise during low priority context workload execution, e.g., when the operating system (OS) detects the movement of a mouse or other pointing device, generating graphical user interface (GUI) contexts that are generally given a higher priority in processing at the microprocessor level than other contexts. GUI workloads may be given high priority as they impact the end user experience directly and immediately.

While computers may be called upon to handle many different kinds of contexts, among the most computationally demanding are those directed to 3D graphics rendering. Contemporary game play and other video intensive programs may place a premium on graphics, and end users can readily judge for themselves the quality of these graphics. A system that is efficient and fast in rendering images may be more desirable than one that is slow and inefficient.

Embodiments here include a high priority port that may be implemented as hardware on the hardware front end command streamer. These embodiments permit high priority contexts to pause, rather than preempt, lower priority contexts, as shall be further developed below. Embodiments may include dedicated on-chip storage built into the 3D-pipeline graphics chip to save and restore the state and workload of a paused low priority context. Embodiments also may include a low priority port for handling low priority contexts that nevertheless may take precedence over certain ongoing workflow.

Embodiments presented herein may address three levels of workflow contexts, here ranked from low to high in terms of their priority:

a. baseline workflow (also referred to herein as low priority context workload, or LPCW);

b. low priority contexts having precedence over baseline workflow; and c. high priority contexts that take precedence over a. and b.

Figure 1:
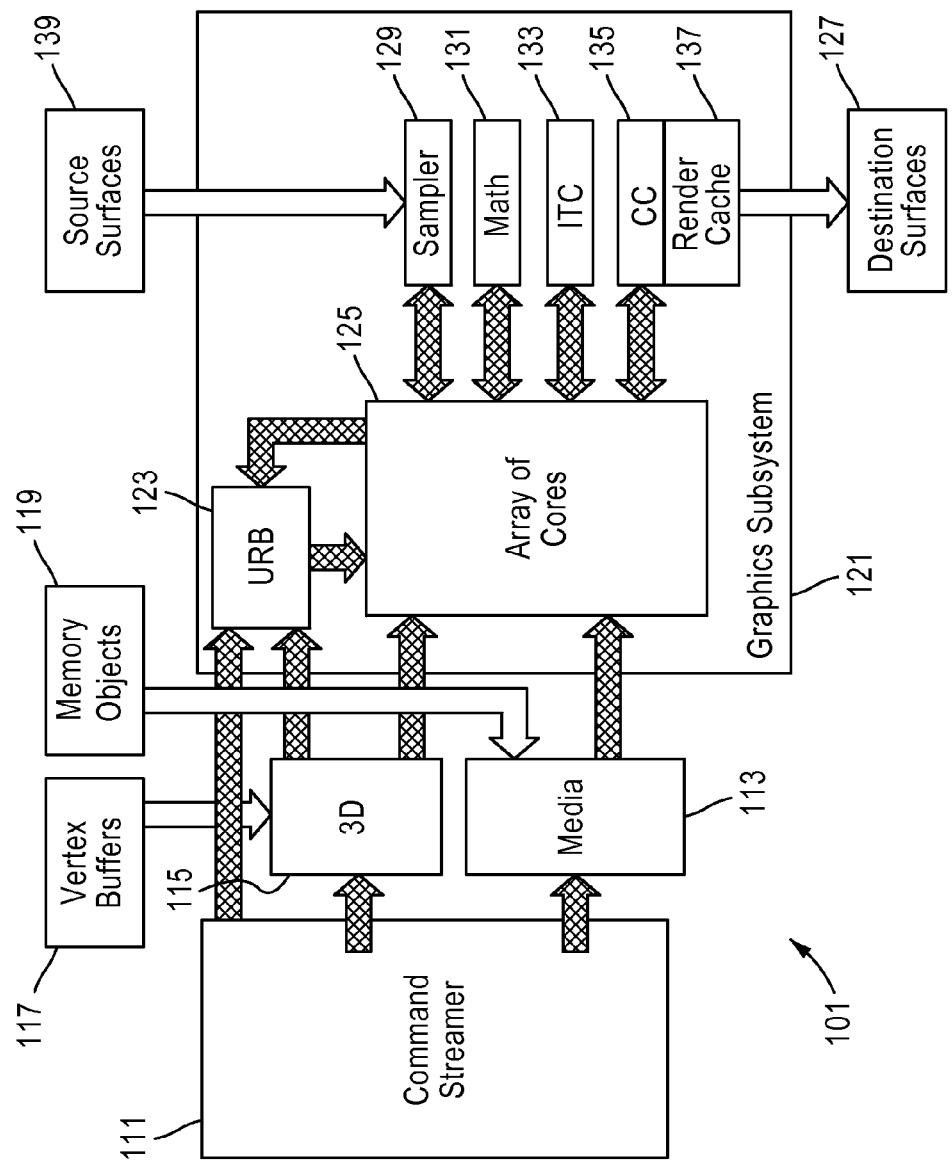
FIG. 1 is a block diagram of an example of a graphics processing architecture according to an embodiment.

FIG. 1 shows a block diagram of an example of a graphics processing unit (GPU) 101 that may be used in examples of embodiments. The illustrated GPU 101 includes a command streamer 111 ("CS," also known in the literature as the hardware front end). Data from the command streamer 111 may be applied to a media pipeline 113. The command streamer 111 may also be coupled to a 3D fixed function pipeline 115. The illustrated command streamer 111 manages the use of the 3D and media pipelines 115, 113 by switching between the pipelines and forwarding command streams to the pipeline that is active. The 3D pipeline 115 may provide specialized primitive processing functions while the media pipeline 113 may provide more general functionality. For 3D rendering, the 3D pipeline 115 is fed by vertex buffers 117 while the media pipeline 113 may be fed by a separate group of memory objects 119. Intermediate results from the 3D and media pipelines 115, 113 as well as commands from the command streamer 111 are fed to a graphics subsystem 121, which is directly coupled to the pipelines and to the command streamer 111.

The illustrated graphic subsystem 121 contains a unified return buffer (URB) 123 coupled to an array of graphics processing cores 125. The unified return buffer 123 may contain memory that is shared among various functions to allow threads to return data that later will be consumed by other functions or threads. The array of cores 125 process the values from the 3D and media pipelines 115, 113 to eventually produce destination surfaces 127. The array of cores may have access to sampler functions 129, math functions 131, inter-thread communications 133, color calculators (CC) 135, and a render cache 137 to cache finally rendered surfaces. A set of source surfaces 139 may be applied to the graphics subsystem 121 and after all of these functions 129, 131, 135, 137, 139 are applied by the array of cores, a set of destination surfaces 127 may be produced. For purposes of general purpose calculations, the illustrated command streamer 111 is used to run operations through the array of cores 125, depending on the particular implementation.

3D rendering processes often make especially intensive use of cycle time and as such this presents challenges to designers seeking to optimize both speed and throughput efficiency. While the embodiments herein are illustrated in terms of the demands made in 3D contexts, the embodiments have broad applicability to other work load situations where speed and throughput are to be optimized.

Figure 2:
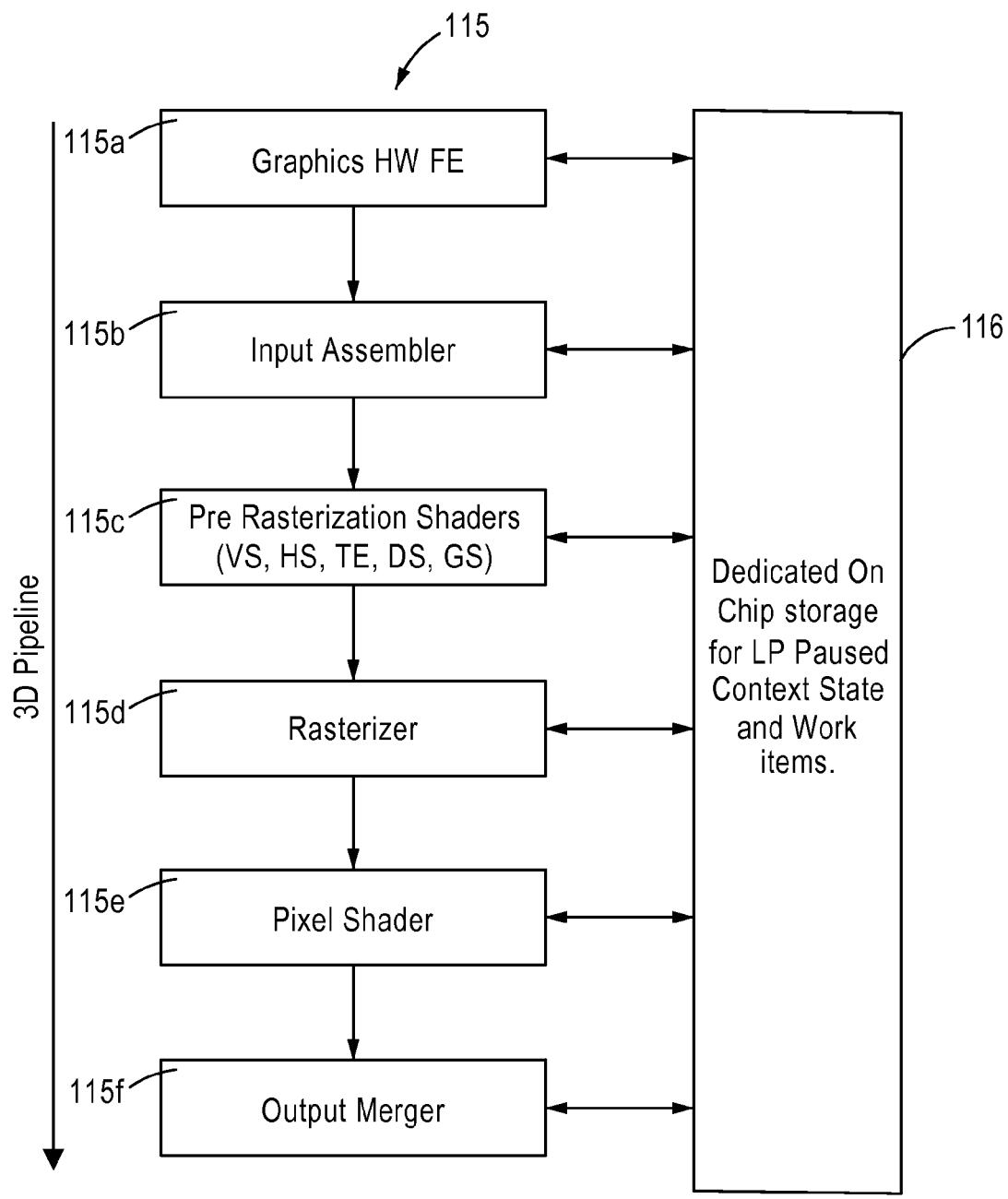
FIG. 2 is a block diagram of an example of a pipeline according to an embodiment.

FIG. 2 presents a more detailed view of the 3D pipeline 115. Here, the pipeline 115 is seen to include a number of stages for handling basic primitive image processing functions for processing 3D images. The illustrated pipeline 115 includes graphics hardware front end (HWFE) 115a, input assembler 115b, pre-rasterization shaders 115c, rasterizer 115d, pixel shader 115e, and output merger 115f. Different hardware implementations may have additional or fewer stages. Each of these stages may be linked to a dedicated on-chip storage memory 116 for storing paused low priority context state and work items. Such ready access to these objects in storage may reduce latency time as is further discussed below.

Figure 3:
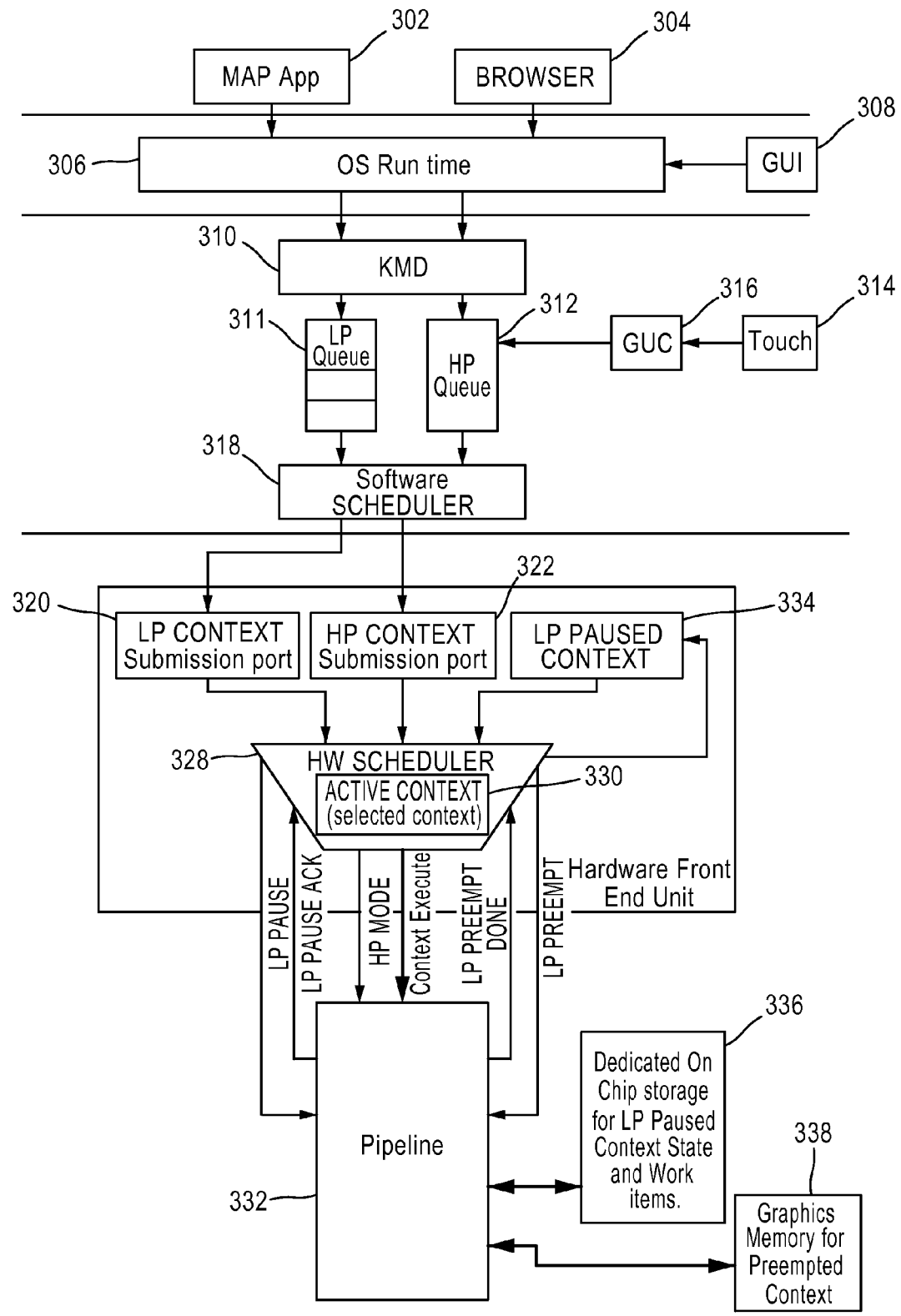
FIG. 3 is a block diagraph of an example of prioritized context flow according to an embodiment.

The block diagram in FIG. 3 illustrates an example of context flow according to one embodiment. In this example, an operating system (OS) 306 is running several applications as depicted in the Figure: a map application 302, a browser 304, and a Graphical User Interface (GUI) 308. The OS 306 may include a kernel mode driver 310 (KMD), which among other things, supports a low priority queue 311 and a high priority queue 312. The latter may receive contexts from a touch device 314 (e.g., mouse or track pad) by way of a graphics micro controller 316. Other hardware and software may also be running; those shown here are exemplary of commonly employed hardware and software that typically generate a number of contexts having different priorities.

In FIG. 3, the low priority queue 311 contains those contexts that, while designated as having "low priority" may still have precedence over other, less time sensitive contexts that make up the bulk of the general low priority context workload. In other words, while queue 311 is captioned "low priority" in this application, its contexts may still be of greater priority than other contexts that it may preempt. Contexts having still greater priority than those in the low priority queue 311 may be directed to the high priority queue 312. The high priority queue 312 may receive contexts from various sources, although in this figure these are shown as touch commands originating on the touch device 314 via graphic micro controller 316. Both the low priority queue 311 and the high priority queue 312 may be implemented either through software or hardware.

The contexts in illustrated queues 311 and 312 are assigned to one of two ports by software scheduler 318, which at a given time may be handling upwards of hundreds or thousands of contexts. The first of these ports is the low priority context submission port 320, which receives low priority contexts from the low priority queue 311. A high priority context submission port 322 receives high priority contexts from the high priority queue 312. In one embodiment, these two ports 320, 322 are both implemented in hardware. The submissions to these ports may then be passed to a hardware scheduler 328.

The illustrated hardware scheduler 328 arbitrates among low priority contexts submitted to the low priority context submission port 320, high priority contexts submitted to the high priority context submission port 322, and such low priority contexts as may be paused, as is explained further below. The hardware scheduler 328 may determine which of these is to be made the active context 330 and forwarded for execution on the pipeline 332. In making that determination, its priority of selection is to first select a high priority context, then any low priority context that has been paused, and then other low priority contexts. The illustrated hardware scheduler 328 forwards the state and workload details such as memory surfaces, memory objects 119 and vertex buffers 117 (FIG. 1) used to process the active context 330 running in the pipeline as the context workload continues on to pipeline 332 for processing. Pipeline 332 may comprise 3D and/or media pipelines such as, for example, the 3D and media pipelines 115, 113 (FIG. 1), as already discussed with respect to one embodiment of the invention. The hardware scheduler 328 may also be responsible for pausing the active context 330 when a higher priority context is awaiting processing, which in turn pauses the pipeline 332. Such pausing may occur when a high priority context has been sent to the high priority context submission port 322. This causes any ongoing low priority context to halt at a suitable logical boundary and to have its state and pending workload and work items copied over into memory.

When a relatively low priority context is paused, its state is saved. In this example, "state" may refer to the hardware configuration including that of each stage of the pipeline needed to process a particular workload/contexts and may further include ancillary software instructions. (For example, whether the context consists of triangles or rectangles and the primitive hardware operations that need to be performed on them.) Any partially processed context, i.e., pending, unfinished work, may also be stored. In the present example, storage for state and partially processed work for paused low priority contexts is provided as dedicated on-die storage memory 336. Providing this mechanism locally on the same die as the GPU or CPU may provide for much faster access times (by several orders of magnitude) when compared to using main memory, resulting in faster subsequent processing of low priority contexts that have been paused.

In response to a pause of a low priority context due to the arrival of a high priority context, the illustrated pipeline 332 signals the hardware scheduler 328 that the pipeline has paused a low priority context and is in a state in which it can accept high priority context. The illustrated hardware scheduler 328 moves the paused low priority context from the active context 330 state to a low priority (LP) paused context 334 state, and processing of the high priority context may begin. The hardware may also remember that the low priority context has been paused and that it may be resubmitted later on for execution following completion of the supervening high priority context execution and before any other low priority context may be taken up.

In the case of a pre-emption by a low priority context where no high priority context is involved, once a low priority context is pre-empted by another low priority context, the software scheduler 318 is updated and knows that the low priority context has been pre-empted and flushed out of the pipeline. Also, some information concerning the pre-empted low priority context state may be saved to memory, such as software instructions for use when the pre-empted low priority context resumes processing in the pipeline. That memory may be main memory, mass storage memory, or DDR (double data rate) memory such as may be allocated for storing graphics contexts. The software scheduler 318 may retain the identity of the pre-empted low priority context so that it can be resubmitted at a later point in time or be discarded.

Figure 4:
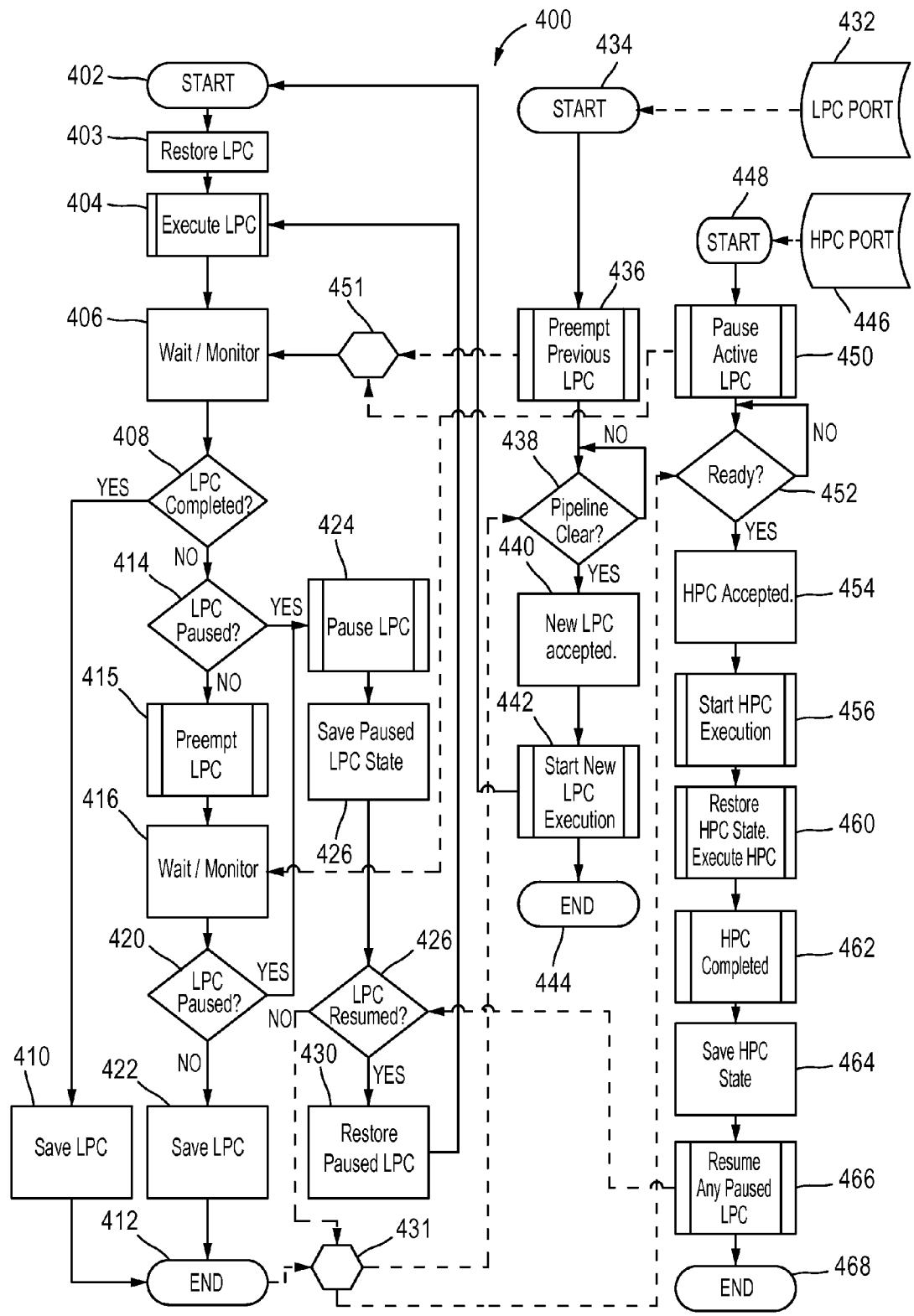
FIG. 4 is a flowchart of an example of a method of handling high priority and low priority context submissions according to an embodiment.

Turning now to FIG. 4, a flowchart of one example of a method 400 of providing for high priority context preemption of lower priority contexts is shown. The method 400 may be implemented in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Turning first to the left hand half of the flow chart, first considered is the case in which there are no high priority contexts to process. In the simplest case, a computer may be in the midst of processing a workflow for 3D rendering. This may mean, for example, that an image is to be generated from thousands of triangle elements that are traversing a 3D image pipeline having the various stages shown in FIG. 2, filling the pipeline with that context. This context may be ordinary, low priority context workload. It begins to execute at illustrated block 404, as in this simple case there may be no low priority context states to restore from memory at block 403, and when there are no pre-emptions or pauses to consider at block 406, execution may complete at block 408. As a matter of good housekeeping and design, the finished, now executed context may be saved to memory at block 410 for further use elsewhere. This memory may be main storage memory or DDR memory on the GPU or any other memory that is convenient for storing a completed context. Also at 410, the software scheduler may be informed that the context has been completed, and the process ends at 412.

It may often be the case that amid the stream of contexts that comprise the general work flow, there are some to which a first measure of priority must be given. Examples of such contexts are varied. For example, in a media context an embodiment may involve showing a movie or clip while a General Purpose Graphics Processing Unit (GPGPU) workload may be working in the background, performing mathematically intensive calculations like N-Body gravity simulations. In this example, media will be given priority over the GPGPU workload. In other embodiments, the reverse may be the case.

While a given context may herein be termed "low priority" with respect to high priority contexts, they may still have higher priority than other contexts in the workflow. Such relative precedence need not always be due to the automatic priority of one use (e.g. mouse movement) over another (e.g., mathematical calculations). For example, in another embodiment, there may be an algorithm implemented in the operating system and running through the software scheduler 318 (FIG. 3) aimed at giving a balanced share of hardware access to all the contexts, leading to pre-emptions that do not necessarily follow the paradigm of providing GPU contexts with priority over other contexts.

Next considered is the case where a low priority context having priority over general workflow is to be processed. The low priority context may be submitted at the low priority context submission port by block 432 at the start block 434. As noted above, contexts so designated have priority over baseline workflow, and they may have priority over other previously submitted low priority context in process. Thus, at block 436 the method may direct that any contexts in the pipeline that are not high priority contexts are to be pre-empted, including a previously submitted low priority context in process. Preemption here means that the workload flowing to the 3D pipeline is halted and the contexts already in the pipeline are flushed out (i.e., allowed to complete execution at the stations such as are shown in FIG. 2). This process of flushing the pipeline may not be instantaneous—it can take thousands of clock cycles, depending on the depth of the pipeline and the amount of work stored in the internal cache memory of its stations. For example, in graphics processing, where triangles are used as a primitive for the rendering of 3D objects, each station in a pipeline may have a cache containing thousands of triangles. The process of flushing the pipeline may entail completing the work on these triangles in the pipeline, thus incurring substantial latency while waiting for the pipeline to clear at illustrated block 438.

Once the pipeline has cleared, at block 440 the software scheduler may receive a status update from the hardware scheduler indicating that the new low priority context has been accepted. At block 442, the low priority context commences the process of execution in the pipeline at block 402, which at block 444 marks the end the submission phase. Execution commences first with a fetch from memory at block 403 of any available state data previously stored in memory, and at illustrated block 404 the hardware may begin executing the workload. While the workload is in execution, at block 406 the pipeline monitors the system for any new preemptions or pauses due to low priority context or high priority context submissions. During execution at block 406, it may be the case that another low priority context arrives via block 451 to pre-empt the context, or that a high priority context has triggered a pause in the context. If there are no further preemptions or pauses, then at block 408 the context completes and may be saved to memory at block 410 as before for any future reuse before ending at block 412.

On the other hand, an incoming low priority context or a high priority context may be detected at block 406, in which case the low priority context does not complete at block 408 but is either paused or pre-empted. At block 414, if there is no pause indicated, then the low priority context is preempted at block 415. A further test of whether there is a pause is conducted at block 420 and if not, there continues to be a pre-emption and at block 422 the low priority context state is saved to memory and hardware scheduler may inform software scheduler that a low priority context has been pre-empted.

A high priority context port at block 446 is provided for the submission of designated high priority contexts. In this example, high priority contexts may be generated by mouse, track pad touch and other GUI commands for which timely execution is especially important. In other embodiments other operations may result in other contexts that may be designated as having high priority. In this embodiment, the high priority context submission port at block 446 is implemented in hardware, although in other embodiments it may be implemented in software.

The high priority contexts are detected by the software scheduler or other part of the operating system. If detected, instead of pre-empting any low priority contexts in the pipeline, which would entail a relatively high latency penalty for flushing the pipeline, at illustrated block 450 a pause of any context in the pipeline is initiated and indication of same may be sent via block 451 to block 406. Instead of flushing the pipeline, any context in the pipeline is permitted to halt at the nearest logical point that could be reached, such as upon completion of in flight operations or transactions underway at the station it may be at. For example, in the case where the context consists of the graphic processing of thousands of triangles at each station in a pipeline, the processing of any individual triangle underway at a station may be allowed to complete, but then the pipeline is paused for that context and the state of the context and the pending/intermediate data in the pipeline is copied into memory/on-chip storage. In terms of the flow chart 400, context may be saved to memory at several locations, including block 410, block 422, block 426, and block 450. The latency incurred in pausing a pipeline may be substantially less than in flushing it.

Once the pause is completed or the prior context already finished execution at block 452, at block 454 the software scheduler may be informed that a high priority context has been accepted. High priority context execution may then begin at block 456. At block 460 any previously stored state information concerning the high priority context that may optionally have been placed in memory may be read to restore that high priority context state, and execution of the high priority context begins. Execution completes at block 462. At block 464 the state of the completed high priority context may be saved to memory for further use later, and the software scheduler may be informed that the high priority context has completed. At block 466 any pending paused low priority context may be resumed, or the overall process may end at 468.

Turning again to the left side of the method 400, further aspects of processing high priority contexts are considered. At block 406 indication of a pause (the mark of a high priority context) arrives, and at block 414 it is acknowledged. Then, at block 424 any active low priority context (which here may mean any context that is not high priority) is paused. At block 426 the state of the paused low priority context any of its intermediate data already generated are saved to memory, such as on-chip storage. Also, the software scheduler is informed that the low priority context has been paused. Block 426 may receive indication from block 466 that work on the paused low priority context may resume, in which case at block 430 the software scheduler is informed that work on the paused context may resume, which it does beginning at block 402.

Figure 5:
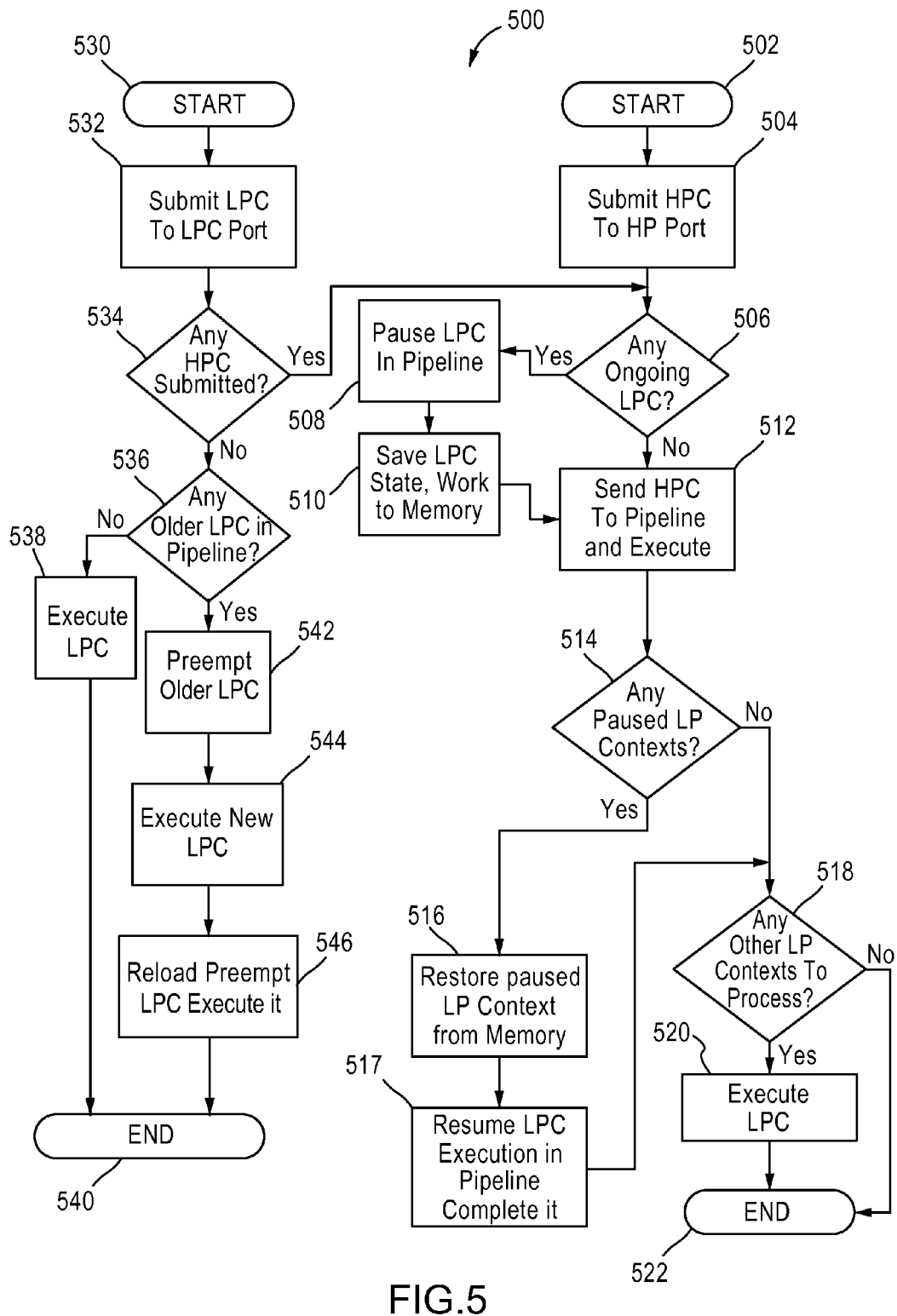
FIG. 5 is a flowchart of an additional example of a method of handling high priority and low priority context submissions according to an embodiment.

Turning now to FIG. 5, another example of a method of providing for high priority context preemption of lower priority contexts is shown via flowchart 500. First considered is the case in which a high priority context is submitted to the high priority port at block 504. If there are no ongoing lower priority contexts to consider at block 506, then the high priority context is sent to the pipeline and is executed at block 512. If, on the other hand, there already is a lower priority context in the pipeline, then that lower priority context is paused at block 508 and its state and unfinished work is saved to storage memory (which may be dedicated on-die storage) at block 510. Additionally, any completed context processing may be stored in main or DDR graphics memory.

After completion of the high priority context at block 512, the system is polled for any paused low priority contexts at 514. If there are none, then at block 518 the system is further polled to determine if there are any other low priority contexts to process. If there are none, then the workflow is at an end. If there are other low priority contexts to process, then this is done at block 520 and then when completed, this workflow is at an end.

Should it be determined at block 514 that there remains a paused low priority context to process, then its state and any partially completed work is restored from memory at block 516 and processed in the pipeline at block 517, after which control passes to block 518 and continues as above.

A low priority context may be submitted to the low priority port at block 532. Following that case through the flowchart 500, at conditional block 534 it is determined whether a high priority context has been submitted to the high priority port. If one has, then flow control passes to block 506 for processing as before. If not, then at block 536 it is further determined whether there are any older low priority contexts in the pipeline. If there are none, then the low priority context is submitted to the pipeline and executed to completion at 538, and the workload is at an end at 540. On the other hand, if another low priority context already is in the pipeline, it is preempted at block 542 and the newer low priority context is executed at block 544. After its completion, the older, preempted low priority context is reloaded at block 546 and executed.

Figure 6:
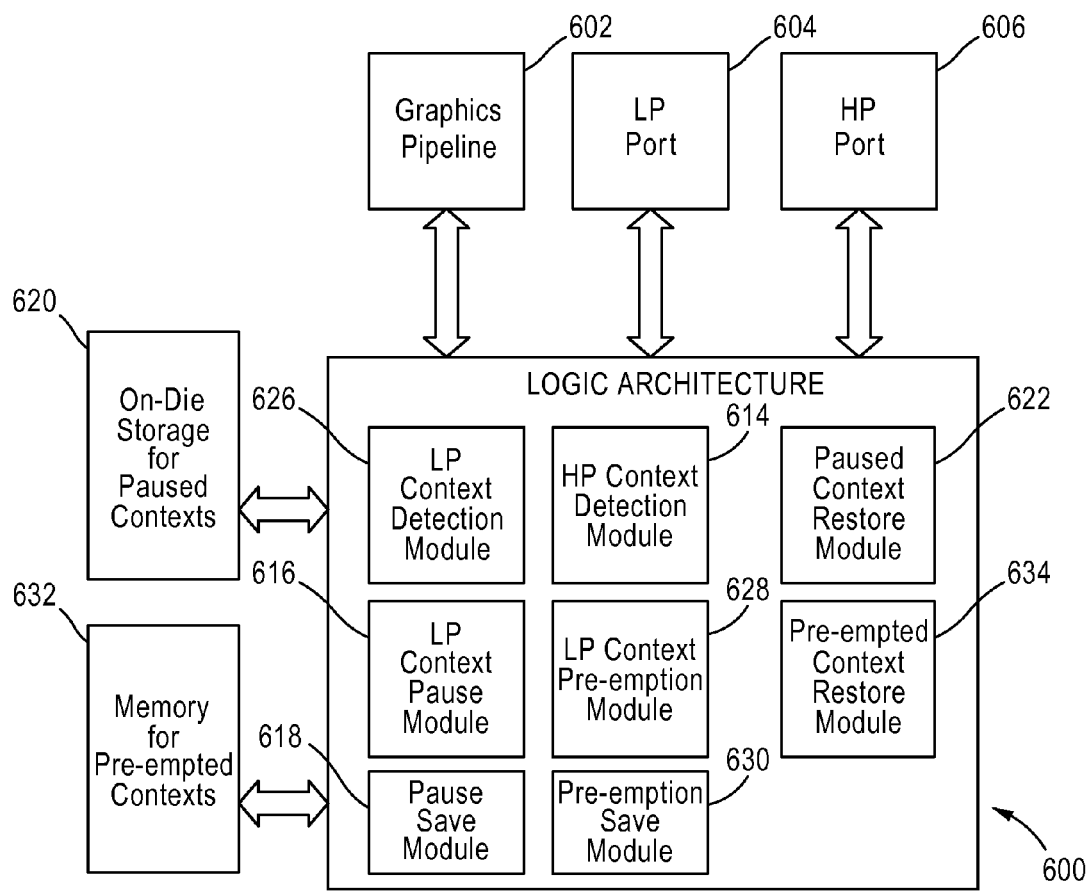
FIG. 6 is a block diagram of an example of a logic architecture according to an embodiment.

An example of a logic architecture 600 according to an embodiment is presented in FIG. 6. The logic architecture 600 includes a graphics pipeline 602, a low priority context port 604 and a high priority context port 606. A high priority context detection module 614 may detect the submission of high priority contexts to high priority port 606. If such a context is detected at a time when a low priority context is the active context in pipeline 602, then the low priority context pause module 616 may pause the low priority context and its state and any partially completed work may be saved by the paused context save module 618 to on-die storage 620. After the high priority context has been processed, the state and any partially completed work of the paused context are restored to the pipeline from the on-die storage 620 by the paused context restore module 622, and work on the paused low priority context resumes.

It may be that there are no high priority contexts to process. In that case, low priority context detection module 626 detects the submission of low priority contexts to low priority port 604. If such a context is detected at a time when another low priority context is the active context in pipeline 602, then the low priority context preemption module 628 preempts the low priority context and certain aspects of its state as well as any finished work may be saved by the preemption context save module 630 to memory 632, which may be main memory or DDR memory. After the low priority context has been processed, such state information as may have been saved and the pre-empted low priority context are restored to the pipeline by the preempted context restore module 622, and work on the preempted low priority context resumes.

Figure 7:
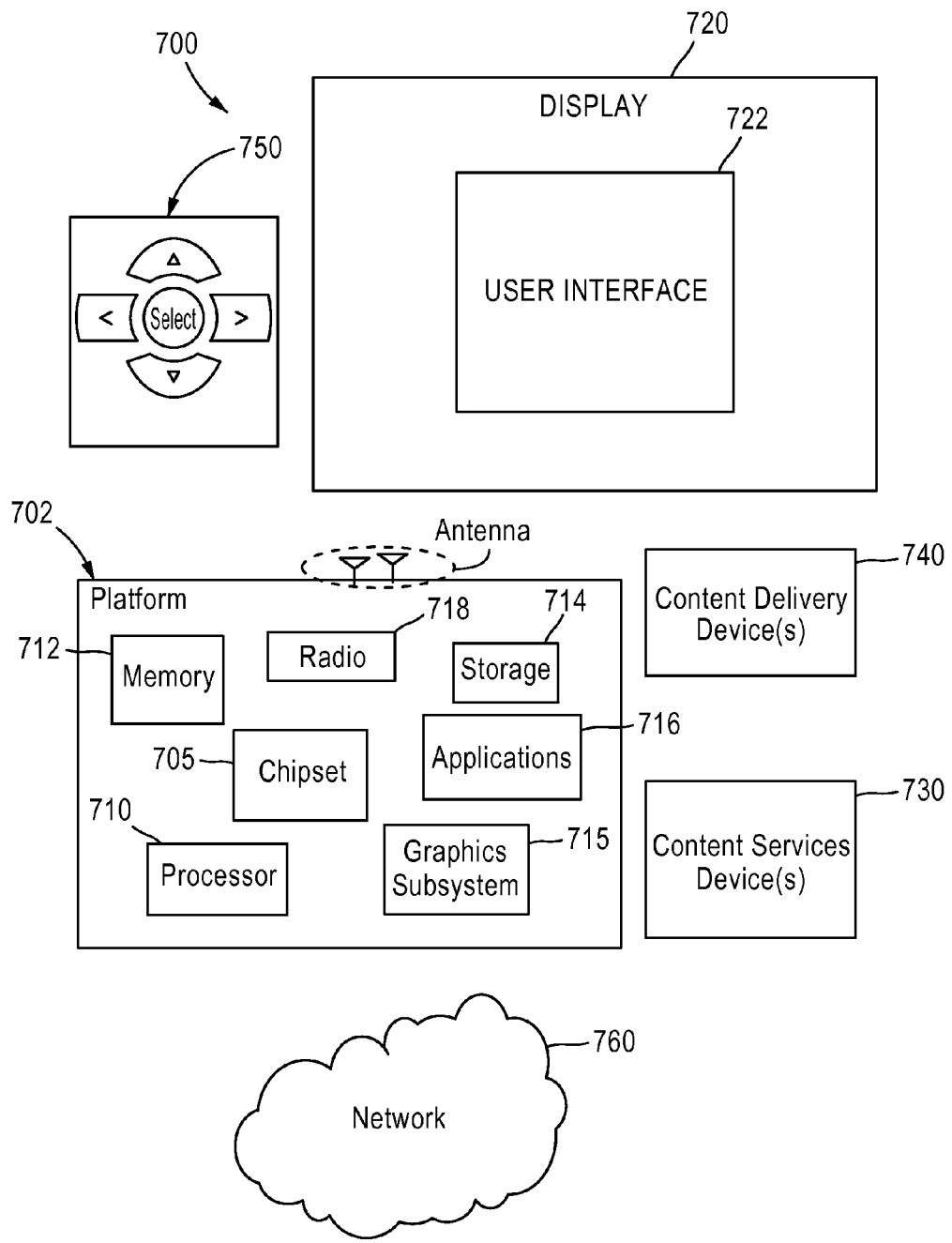
FIG. 7 is a block diagram of a system according to an embodiment.

FIG. 7 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to render images as described herein.

In embodiments, the system 700 comprises a platform 702 coupled to a display 720. Platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the GPU 101 (FIG. 1), already discussed. In addition, the processor 710 may be configured to operate as a CPU via instructions obtained from the memory 712, the storage 714 or other suitable source. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
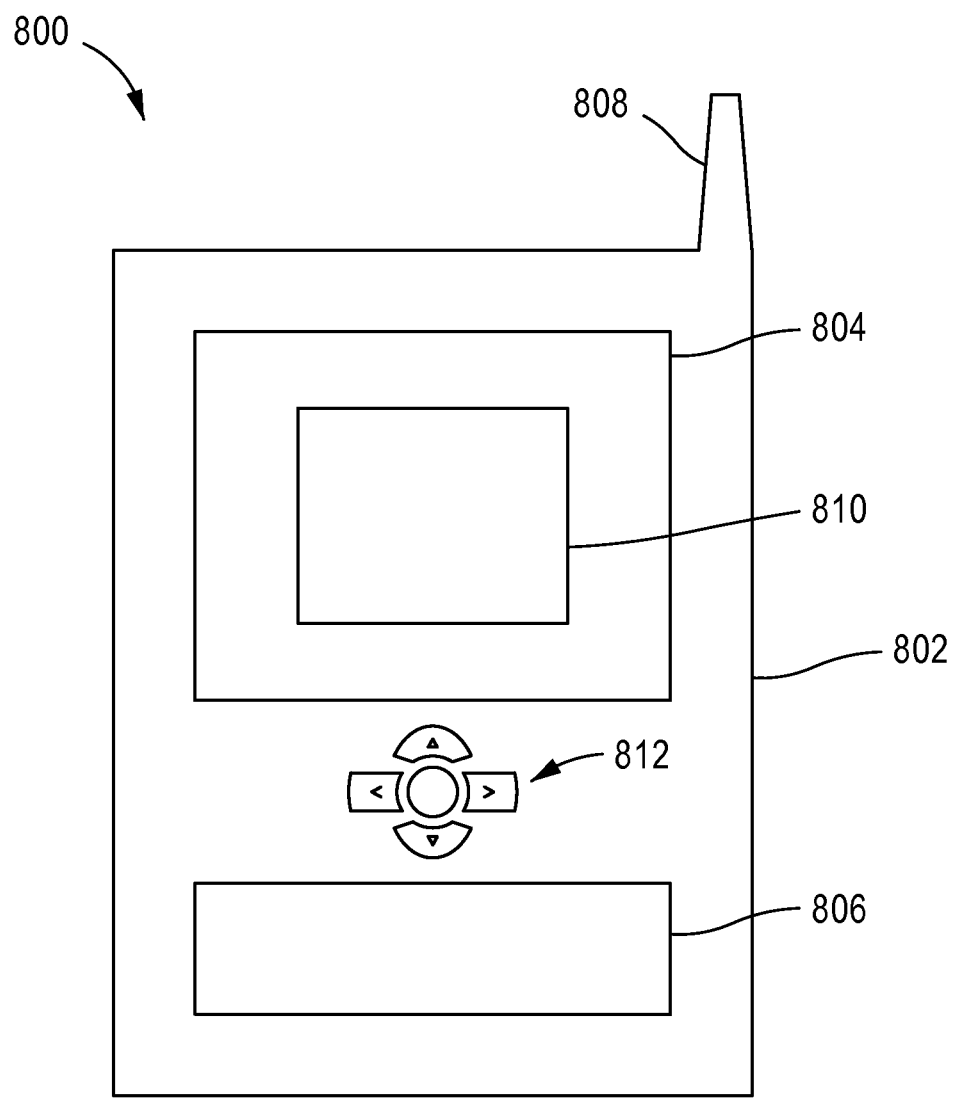
FIG. 8 is a block diagram of an example of a system having a small form factor according to an embodiment.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise navigation features 812. Display 804 may comprise any suitable display unit for displaying information 810 appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Additional Notes and Examples

Example 1 may include a system having processor, a pipeline, a first port to receive contexts having a first priority, a second port to receive a context having a second priority that is higher than the first priority, a second priority context detection module to detect receipt of the context having the second priority at the second port, and a pause module to pause a context in the pipeline after the second priority context detection module has detected the receipt of the context having the second priority at the second port.

Example 2 may include the system of Example 1, further including on-die storage to store a state of at least one of the contexts, wherein the on-die storage and the processor are on a common die.

Example 3 may include the system of Example 2, further including a restoration module to restore a paused context after the context having a second priority has been completed.

Example 4 may include the system of Example 3, wherein at least one of the modules is implemented in software.

Example 5 may include the system of Example 1, wherein the pause module is implemented in hardware.

Example 6 may include the system of Examples 1 or 2, further comprising a preemption module to pre-empt a context in the pipeline after a context has been submitted to the first port.

Example 7 may include the system of any of the preceding Examples, further comprising a preemption restoration module that can restore a context that has been pre-empted.

Example 8 may include the system of any of Examples 1, 2, 4 or 5, further comprising a pause restoration module that can restore a context that has been paused.

Example 9 may include the system of any of the preceding Examples, further comprising a three-dimensional (3D) graphics processor.

Example 10 may include a method comprising submitting a first context to a first port dedicated to contexts having a first priority, submitting the first context to a pipeline, submitting a second context to a second port dedicated to contexts having a second priority, and pausing the first context before it completes in the pipeline.

Example 11 may include the method of Example 10, further including detecting the submission of the context to the second port.

Example 12 may include the method of Example 10, further including copying a state and unfinished work of the first context to on-die storage and then submitting the second context to the pipeline.

Example 13 may include the method of Example 12, further including resuming the first context after the second context has been completed.

Example 14 may include the method of any of Examples 10-13, further including pre-empting a context in the pipeline after a context has been submitted to the first port.

Example 15 may include at least one computer readable storage medium comprising a set of instructions which, when executed by a computing device, cause the computing device to submit a first context to a first port dedicated to contexts having a first priority, submit the first context to a pipeline, submit a second context to a second port dedicated to contexts having a second priority, and pause the first context before it completes in the pipeline.

Example 16 may include the at least one computer readable storage medium of Example 15, wherein the instructions, when executed, cause the computing device to detect the submission of a context to the second port.

Example 17 may include the at least one computer readable storage medium of Example 15, wherein the instructions, if executed, cause a computing device to copy the state and unfinished work of the first context to on-die storage and then submit the second context to the pipeline.

Example 18 may include the at least one computer readable storage medium of any of Examples 15-17, wherein the instructions, if executed, cause a computing device to resume the first context after the second context has been completed.

Example 19 may include the at least one computer readable storage medium of any of Examples 15-17, wherein the instructions, if executed, cause a computing device to pre-empt a context in the pipeline after a context has been submitted to the first port.

Example 20 may include an apparatus comprising a first port to receive contexts of a first priority, a second port to receive contexts of a second priority, a pipeline to process contexts, a context detection module to detect the submission of contexts to the ports, a scheduler module to send contexts to the pipeline, and a pause module to pause the pipeline processing of contexts received at the first port in favor of contexts received at the second port.

Example 21 may include the apparatus of Example 20, further comprising on-die memory to store the state of at least one of the contexts.

Example 22 may include the apparatus of Example 20, further comprising a restoration module to restore a context to the pipeline.

Example 23 may include the apparatus of either of Examples 20 or 21, further comprising memory to store state information concerning contexts.

Example 24 may include the apparatus of Example 20, further comprising a graphical processing unit.

Example 25 may include the apparatus of any of Examples 20-22, further comprising a paused context restore module to resume a paused context after the completion of a context submitted to the second port.

Example 26 may include an apparatus comprising a pipeline, a first port for submitting contexts having a first priority, a second port for submitting contexts having a second priority, means for detecting the submission of a context to the second port, and means for pausing a context in the pipeline after the submission of a context to the second port has been detected.

Example 27 may include the apparatus of Example 26, wherein the means for pausing the context is implemented in software.

Example 28 may include the apparatus of Example 26, wherein the means for pausing the context is implemented in hardware.

Example 29 may include the apparatus of Example 26, further comprising on-die memory in which the state of a context having a first priority is stored.

Example 30 may include the apparatus of Examples 26 or 29, further comprising memory in which the state of a context having a second priority is to be stored.

Example 31 may include the apparatus of Example 26, further comprising memory for storing the state of a context submitted to one of the ports, and a module for resuming a paused context.

Example 32 may include the apparatus of any of Examples 26-29, further comprising means to pre-empt a context in the pipeline after a context has been submitted to the first port.

Example 33 may include the apparatus of Example 32, further comprising means to restore a context that has been pre-empted.

Example 34 may include the apparatus of Example 26, further comprising means to restore a context that has been paused.

Example 35 may include the apparatus of Example 26, further comprising a plurality of pipelines.

Example 36 may include a method of prioritizing tasks to be processed by a processor comprising providing first and second ports corresponding to tasks of lower and higher levels of processing priority respectively, forwarding lower priority tasks submitted to the first port to a pipeline, pre-empting any lower priority task currently being performed in the pipeline by flushing the pipeline of any such lower priority tasks as may be in it when a task is submitted to the first port and submitting in its place a task that has been submitted to the first port, and pausing any lower priority tasks as may be in the pipeline when a task is submitted to the second port and submitting in its place a task submitted to the second port.

Example 37 may include the method of Example 36, wherein the task submitted to the second port comprises graphics.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A system comprising:
a processor;
a pipeline;
a first port to receive contexts having a first priority;
a second port to receive contexts having a second priority that is higher than the first priority;
a context detection module to detect receipt of the contexts having the second priority at the second port;
a pre-emption module to pre-empt a context having the first priority in the pipeline, wherein to pre-empt the context having the first priority in the pipeline is to include flushing the pipeline by permitting the context having the first priority already in the pipeline to complete execution when the first port receives another context having the first priority;
a pause module to pause the context having the first priority in the pipeline before it completes in the pipeline and without flushing the pipeline after the context detection module has detected the receipt of a context having the second priority at the second port; and
on-die storage to store a state of the paused context.

2. The system of claim 1, wherein the on-die storage and the processor are on a common die.

3. The system of claim 2, further comprising a restoration module to restore a paused context after the context having the second priority has been completed.

4. The system of claim 3, wherein at least one of the modules is implemented in software.

5. The system of claim 1, wherein the pause module is implemented in hardware.

6. The system of claim 1, further comprising a preemption restoration module to restore a context that has been preempted.

7. The system of claim 1, further comprising a pause restoration module to restore a context that has been paused.

8. The system of claim 1, comprising a three-dimensional (3D) graphics processor.

9. A method comprising:
submitting a first context to a first port dedicated to contexts having a first priority;
submitting the first context to a pipeline;
pre-empting the first context in the pipeline by flushing the pipeline so as to permit the first context already in the pipeline to complete execution when another context has been submitted to the first port;
submitting a second context to a second port dedicated to contexts having a second priority, wherein the second priority is higher than the first priority;
in response to submitting the second context to the second port, pausing the first context already in the pipeline before it completes in the pipeline, wherein the pipeline is not flushed; and
saving a state of the paused context.

10. The method of claim 9, further including detecting the submission of the second context to the second port.

11. The method of claim 9, further including copying a state and unfinished work of the first context to on-die storage and then submitting the second context to the pipeline.

12. The method of claim 11, further including resuming the first context after the second context has been completed.

13. At least one non-transitory computer readable storage medium comprising a set of instructions which, if executed by a computing device, cause the computing device to:
submit a first context to a first port dedicated to contexts having a first priority;
submit the first context to a pipeline;
pre-empt the first context in the pipeline by flushing the pipeline so as to permit the first context already in the pipeline to complete execution when another context has been submitted to the first port;
submit a second context to a second port dedicated to contexts having a second priority, wherein the second priority is higher than the first priority;
in response to submitting the second context to the second port, pause the first context already in the pipeline before it completes in the pipeline, wherein the pipeline is not flushed; and
save a state of the paused context.

14. The at least one non-transitory computer readable storage medium of claim 13, wherein the instructions, if executed, cause a computing device to detect the submission of the second context to the second port.

15. The at least one non-transitory computer readable storage medium of claim 13, wherein the instructions, if executed, cause a computing device to copy a state and unfinished work of the first context to on-die storage and then submit the second context to the pipeline.

16. The at least one non-transitory computer readable storage medium of claim 15, wherein the instructions, if executed, cause a computing device to resume the first context after the second context has been completed.

17. An apparatus comprising:
a first port to receive contexts of a first priority;
a second port to receive contexts of a second priority;
a pipeline to process contexts;
a context detection module to detect the submission of contexts to the ports;
a scheduler module to send contexts to the pipeline;
a pre-emption module to pre-empt a context having the first priority in the pipeline, wherein to pre-empt the context having the first priority in the pipeline is to include flushing the pipeline by permitting the context having the first priority already in the pipeline to complete execution when the first port receives another context having the first priority;
a pause module to pause the pipeline processing the context having the first priority before it completes in the pipeline and without flushing the pipeline when a context having the second priority is received at the second port, wherein the second priority is higher than the first priority; and
on-die storage to store a state of at least one of the paused contexts.

18. The apparatus of claim 17, further comprising a restoration module to restore a context to the pipeline.

19. The apparatus of claim 17, further comprising memory to store state information concerning contexts.

20. The apparatus of claim 17, further comprising a graphical processing unit.

21. The apparatus of claim 17, further comprising a paused context restore module to resume a paused context after the completion of a context submitted to the second port.

* * * * *